L. B. FULTON.

GAGE COCK.

No. 10,398. Reissued Oct. 30, 1883.

Witnesses:—
T. J. Patterson
Saml. Cunningham

Louis B. Fulton,
Inventor
by Connolly Bros & McTighe
Attorneys

UNITED STATES PATENT OFFICE.

LOUIS B. FULTON, OF PITTSBURG, PENNSYLVANIA.

GAGE-COCK.

SPECIFICATION forming part of Reissue Letters Patent No. 10,398, dated October 30, 1883.

Original No. 267,416, dated November 14, 1882. Application for reissue filed September 27, 1883.

*To all whom it may concern:*

Be it known that I, LOUIS B. FULTON, of Pittsburg, in the county of Allegheny and State of Pennsylvania, have invented certain new and useful Improvements in Gage-Cocks; and I do hereby declare that the following is a full, clear, and exact description of the invention, that will enable others skilled in the art to which it appertains to make and use the same, reference being had to the accompanying drawings, and to the letters of reference marked thereon, which form a part of this specification, in which—

Figure 1:
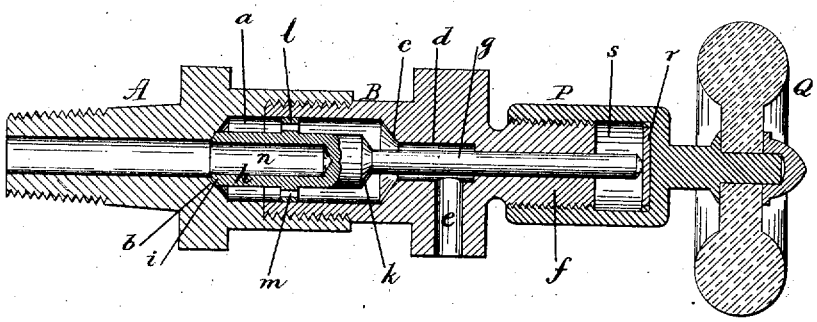
Figure 3:
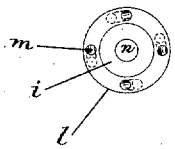
Figure 2:
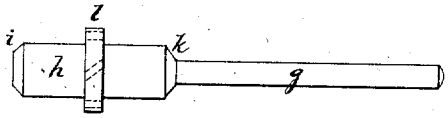
Figure 5:
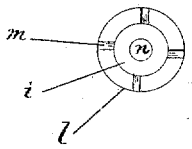
Figure 4:
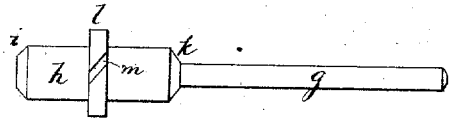

Figure 1 is a longitudinal section of my improved gage-cock. Fig. 2 is a side view of the valve and stem. Fig. 3 is an end view of the same. Fig. 4 is a side view of modified propeller on stem, and Fig. 5 an end view of same.

This invention has for its object the construction of a self-grinding gage-cock especially adapted to locomotive and other boilers, wherein the valve is seated by direct movement of a handle, and the further object of providing means for remedying the annoyance of a leak in the valve or seat during a trip of the locomotive or steamboat, or while steam is up in a stationary boiler.

The invention consists in constructing the cock with two valves, closing, respectively, with and against the pressure, and two corresponding valve-seats; further, in the construction and combination of parts, substantially as hereinafter described and claimed.

A is the section which is to be screwed into the boiler-head. Another section, B, screws into the outer end of A, and both sections are recessed to form the chamber *a*, at whose inner end I form the valve-seat *b* in section A, and at the outer end the valve-seat *c* in section B. The latter section has a passage, *d*, outside the seat *c*, which communicates with the exterior through the transverse passage *e*, passage *d* being larger than the valve-stem. Section B has the projecting end *f* bored centrally for the passage of the valve-stem *g*. Stem *g* is rounded at its outer end, and at its inner end is enlarged, and at each end of its enlargement *h*, I form the valves *i* and *k*, respectively, as shown.

About the center of the enlargement *h*, I construct the rotating collar *l*, playing freely with the valve-stem in the chamber *a* and having the spiral holes or slits *m*, as shown. I bore out the enlargement *h* at its inner end to form the cavity *n*, which not only serves to lighten the body, but also to center the stem, by the action of the steam against the edge formed by the conical valve *i*, the steam thus spreading out in an annular sheet before striking the collar *l*.

The end *f* of section B is threaded to receive the threaded and recessed nipple P, which is provided with a hand-wheel, Q, or similar device for operating. I place a hard-metal plate, *r*, in the end of recess *s*, to withstand the wear of the stem *g*.

Thus constructed, the operation is as follows: For locomotive and other boilers subject to vibration it is desirable to close the valve positively. For this purpose I screw the handle Q inwardly until the plate *r* forces the stem *g* inwardly far enough to close the inner valve, *i*, against the seat *b*, as shown in Fig. 1. When the cock is to be tried, the handle Q is unscrewed slightly, and the pressure of steam forces it open, causing the end of stem *g* to rest against the plate *r* or the end of recess *s*. In this position, if the part *h* of the stem has the collar *l*, the steam or water escaping through the spiral openings will cause the stem and valve to rotate, and this rotation continues till it is checked by grinding against its seat in the act of closure. If, while the locomotive is running or the steam still generating in a boiler, the valve *i* becomes leaky, and troublesome thereby, I unscrew the handle Q till the valve *k* closes against the seat *c*, and I am thus rid of the annoying leak till an opportunity is presented of repairing the valve *i*. I thus normally use the valve *i* positively, and in case of leaks bring the valve *k* into action.

For some boilers I can use the valve *k* normally, effecting the closure by steam-pressure, and in emergency use the valve *i*—the reverse of that just described. When the valve *k* is seated, the cock is tried by screwing in the handle Q, thus pressing the valve *k* off its seat *c* and allowing the steam or water to escape at *e*. In this case, also, if the collar *l* be on the part *h*, the stem *g* will be set in rapid rotation. I have thus always an extra valve and seat to do duty in case of an accident happening to the one in use.

Where the water used is apt to form scale, it is important to be able to immediately stop a leaky gage-cock, as, if the leak be not controlled, the outlet of the cock will, unless the latter is very frequently tested, become covered with mud or sediment, which soon bakes into an impenetrable mass and renders the cock useless until repaired.

Instead of screwing the nipple P over the end *f*, it may be so fitted as to screw into the latter. This form would take less metal.

It will be observed that, independently of the rotative function, the chamber *a* and collar *l* necessarily combine to act as guide to the valves *i* and *k*, especially the former, which is farthest from stem *g*.

I claim as my invention—

1. In a gage-cock having a valve seating against the pressure and capable of rotation, the combination, with said valve, of a rotative device located at a point forward of the valve and seat, substantially as described.

2. In a gage-cock having a valve seating against the pressure, the combination, with said valve and its seat, of an enlarged cylindrical chamber in front of said valve and seat and a device on the valve or its stem located in front of said valve and seat and in said chamber, and adapted to rotate the said valve by the projectile force of escaping steam or water, substantially as described.

3. In a gage-cock having a valve-seating against the pressure, and means of rotation therefor under the projectile force of steam or water, the combination therewith of guiding and centering devices located in front or forward of said valve and inside the cock, substantially as described.

4. A gage-cock provided with two valves and corresponding seats, both said valves being on a single stem, one valve arranged to close positively and the other to close by the boiler-pressure, substantially as described.

5. In a gage-cock, the combination of the sections A B, having the respective valve-seats *b c*, chamber *a*, and outlet *d e*, with loose reciprocating or sliding stem *g*, having the valves *i* and *k*, the former arranged to close positively and open by the boiler-pressure, and the latter arranged to open positively and close by the boiler-pressure, substantially as described.

6. In a gage-cock, the combination of the rotating valve-stem *g*, nipple P, having recess *s*, and hard-metal plate *r*, substantially as described.

7. In a gage-cock, the combination, with a valve seating against the pressure, of a chamber in front of said valve larger in diameter than the valve-seat, and a guiding device on the valve fitting said chamber and serving to guide the valve to its seat, substantially as described.

In testimony that I claim the foregoing I have hereunto set my hand.

LOUIS B. FULTON.

Witnesses:
T. J. PATTERSON,
T. J. MCTIGHE.